United States Patent Office 3,659,005
Patented Apr. 25, 1972

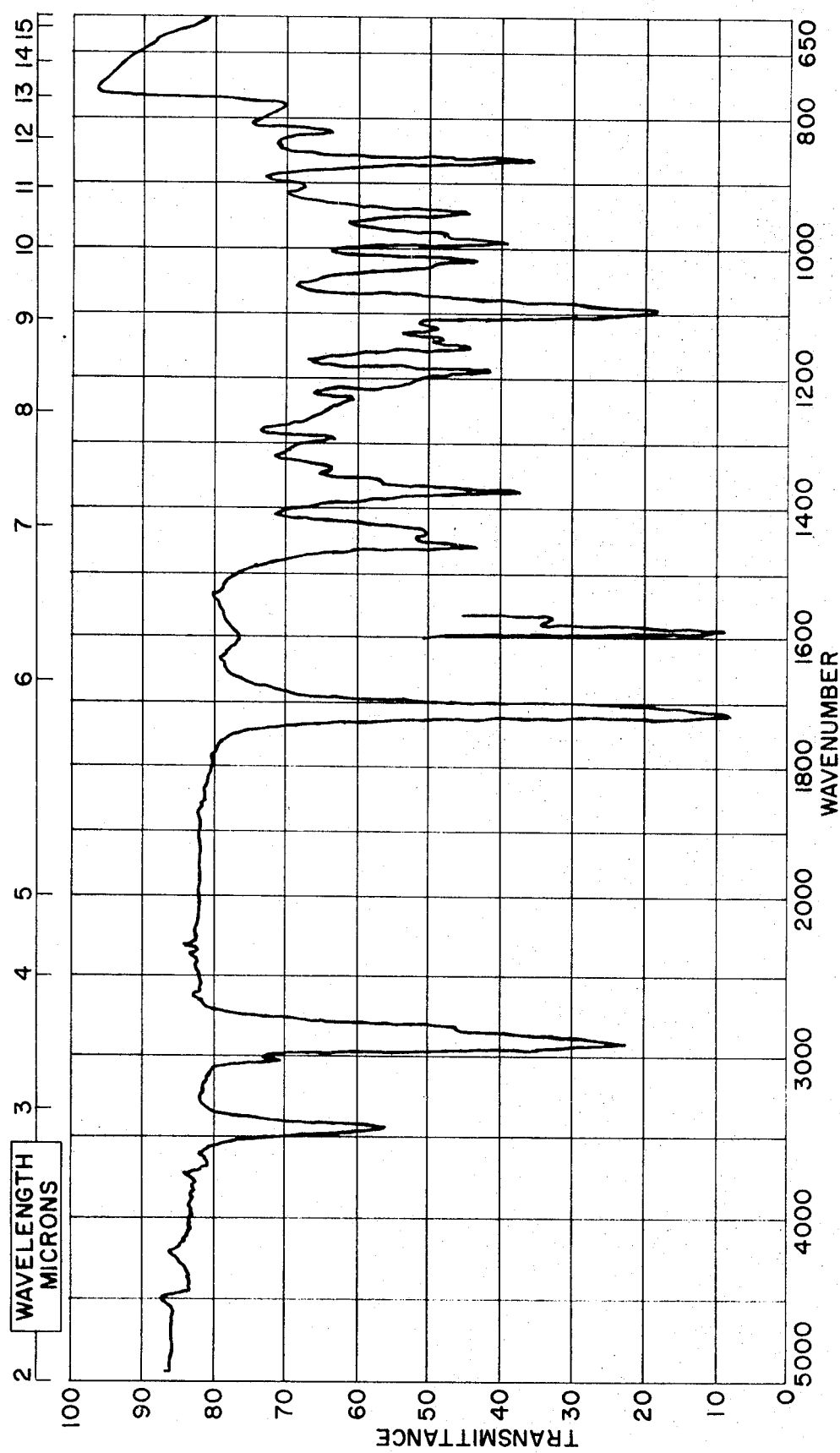

3,659,005
EPOXIDES
Hans-Peter Sigg, Binningen, and Christian Stoll, Basel, Switzerland, assignors to Sandoz Ltd. (also known as Sandoz AG), Basel, Switzerland
Filed Apr. 8, 1969, Ser. No. 814,394
Claims priority, application Switzerland, Apr. 16, 1968, 5,565/68
Int. Cl. C07d 1/18
U.S. Cl. 260—348 R                                   1 Claim

ABSTRACT OF THE DISCLOSURE

The invention provides a new antibiotic derivative of formula

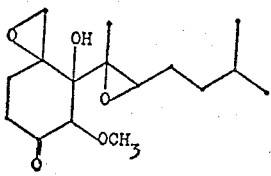

The new antibiotic derivative is useful in inhibiting the production of antibodies and the formation of cellular immunity reactions.

---

The present invention provides a new antibiotic derivative of Formula I,

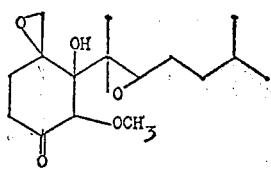

(I)

and a process for its production, characterized in that the antibiotic SL 1846 of Formula II

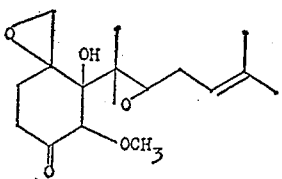

(II)

is catalytically hydrogenated.

The hydrogenation of the antibiotic SL 1846 is preferably effected by hydrogenating the antibiotic SL1846 in a suitable solvent, with catalytically activated hydrogen. Lower aliphatic alcohols, e.g. methanol, are preferably used as solvents, but ethyl acetate may likewise be used. Hydrogenation is suitably effected at a temperature of about 15 to 30° C. under atmospheric pressure or a slightly elevated pressure, in the presence of a platinum or palladium catalyst, e.g. palladium on calcium carbonate, charcoal or barium sulphate. The hydrogenated derivative of the antibiotic SL 1846 obtained in this manner is subsequently purified in manner known per se.

The antibiotic SL 1846, used as starting material, may be produced in accordance with French patent specification No. 1,503,233.

As set forth in the French patent, the substance SL 1846 is prepared by cultivating a hitherto unknown strain of the fungus species *Pseudeurotium ovalis* Stolk in a nutrient solution and the substance is isolated from the fermentation solution and purified in known manner, e.g., by extraction or adsorption.

The strain of *Pseudeurotium ovalis* Stolk used in the preparation of SL 1846 was isolated from a soil sample from Rio de Janeiro and a specimen thereof has been deposited with the United States Department of Agriculture (Northern Utilization Research and Development Division), Peoria, Ill., USA, under the reference NRRL 3194.

The strain of the fungus species *Pseudeurotium ovalis* Stolk corresponds morphologically to the descriptions given by A. C. Stolk, Antonie van Leeuwenhoek 21, 1955, and C. Booth, Mycological Papers No. 83, 1961.

It grows at 27° on malt-yeast agar with a compact, flat, grey-rose colored aerial mycelium. The cleistothecia develop on the substratum mycelium and are covered by aerial mycelium. They are round, red-brown and have a diameter of 90–180μ. The transient asci measure 7.5–9 x 6.5–8μ. They contain eight elliptical, flat, light brown or olive colored ascospores, measuring 5.5–6 x 3.5–4μ. The Sporotrichum-like secondary fruit form develops simultaneously with the main fruit form.

It is also possible to prepare the compound SL 1846 using strains like those obtainable from the strain of *Pseudeurotium ovalis* Stolk, for example by selection or mutation by ultraviolet or X-ray irradiation or other measures, for example by treatment of laboratory cultures with suitable chemicals.

The strain of *Pseudeurotium ovalis* Stolk may be cultivated on various nutrient media containing the usual nutrients. Nutrients normally used for heterotrophic organisms are utilized for this strain: glucose, starch, dextrines, lactose, and cane sugar, for example, may be used as carbon source; organic or mineral nitrogen compounds such as peptones, yeast or meat extracts, ammonium sulphate, ammonium nitrate, and amino acids may be used as nitrogen source, as well as the usual mineral salts and trace elements.

Preferably, a liquid nutrient medium is inoculated with conidia or mycelium of the strain of *Pseudeurotium ovalis*. The cultivation, for example, is effected under aerobic conditions, in surface culture or in submerged culture while shaking or in fermenters while aerating with air or oxygen while stirring. The temperature at which the cultivation is effected may range between 20 and 35° C., but it is preferred to use a temperature between 25 and 30° C. and a pH value of 5–7, in which case the culture is incubated for 4 to 10 days.

One specially suitable method for isolating the antibiotic SL 1846 is the extraction of the culture filtrate with ethylene chloride, though other organic solvents, e.g., benzene, ethyl acetate, butyl acetate, chloroform or butanol, may also be used. Subsequently, the extracts are separated from the solvent, e.g., by distillation, and the residue purified chromatographically by absorbing agents, e.g., activated alumina, silica gel or magnesium silicate, or by means of counter current distribution, in order to isolate the desired antibiotic.

The antibiotic SL 1846 has the following characteristics: SL 1846 is a colorless, crystalline neutral compound having the gross formula $C_{16}H_{24}O_5$, a melting point of 89–92° C. and a specific rotation of $[\alpha]_D^{20} = -117°$ (c.=0.40 in chloroform). Ultraviolet spectrum: maximum at 284.5 mμ log ε=1.63) and a strong final absorption at 210 mμ (log ε=3.1) (in methanol). Infrared spectrum: bands at 3500, approximately 3000, 1725, 1600, 1460, 1390, 1120, 1040, 1030, 1000, 970, 880, 840 cm.$^{-1}$ (in methylene chloride).

The new antibiotic derivative of SL 1846 is useful because it possesses pharmacological activity in animals. In particular, the derivative is useful in inhibiting the production of antibodies and the formation of cellular immunity reactions as is indicated by its strong or complete inhibitionary action against the formation of haemagglutinins in mice, rats, monkeys and guinea pigs which have been immunized with foreign erythrocytes, and its action in suppressing the symptoms of experimental allergic encephalomyelitis in rats and rabbits and in delaying the rejection of homologous skin transplantations in mice.

The toxicity of the antibiotic derivative of SL 1846 is low and the $LD_{50}$ (acute) in white mice is greater than 1000 mg./kg. i.p.

For the abovementioned use, the dosage administered will of course vary depending upon the compound employed, mode of administration, and treatment desired. However, in general, satisfactory results are obtained when administered at a daily dosage of from about 0.1 milligram to about 7 milligrams per kilogram of animal body weight, which may be given in divided doses 1 to 4 times a day or in sustained release form. For the larger mammals, a suitable total daily dosage is in the range of from about 10 milligrams to about 500 milligrams, and unit dosage forms suitable for per os administration comprise from about 2.5 milligrams to about 500 milligrams of the antibiotic derivative admixed with a solid or liquid pharmaceutical carrier or diluent.

The new antibiotic derivative of SL 1846 may be used as medicament on its own or in the form of appropriate medicinal preparations for enteral or parenteral administration. In order to produce suitable medicinal preparations the antibiotic derivative is worked up with inorganic or organic, pharmacologically inert adjuvants. Examples of such adjuvants are for tablets and dragées: lactose, starch and talc;
for syrups: solutions of cane sugar, invert sugar and glucose;
for injectable solutions: water, alcohols, glycerin and vegtable oils;
for suppositories: natural or hardened oils and waxes.

The preparations may furthermore contain suitable preserving, stabilizing and wetting agents, solubilizers, sweetening and colouring substances and flavourings.

In the following examples which illustrate the process without in any way limiting the scope of the invention, all temperatures are indicated in degrees centigrade.

EXAMPLE 1

100 liters of a nutrient solution containing in 1 liter:

| | G. |
|---|---|
| Glucose | 20 |
| Malt extract (Schweiz. Ferment AG) | 2 |
| Bacto-Yeast extract | 2 |
| Peptone | 2 |
| $KH_2PO_4$ | 2 |
| $MGSO_4 \cdot 7H_2O$ | 2 | and demineralized water to make up 1 liter, are inoculated in a fermenter with 10 liters of a preculture of *Pseudeurotium ovalis*, strain NRRL 3194 and incubated at 27° for 111 hours while aerating (75 liters of air per minute) and stirring (150 revolutions per minute).

The culture solution is filtered and the filtrate having a pH of 5–6 is extracted 3 times successively, each time with 50 liters of ethylene chloride. The ethylene chloride extract is washed once with 5 liters of water, dried over magnesium sulphate and evaporated to dryness in a vacuum after filtration. The residue is chromatographed on 300 g. of silica gel (Merck 0.2–0.5 mm.). For the elution, a mixture of chloroform and methanol is used in the proportion of 99.5 to 0.5, the fraction volume being 100 ml. The fractions 28–39 yield the crystalline, colorless compound SL 1846, having a melting point of 89–92°, from ether/pentane.

The 10 liters of preculture of *Pseudeurotium ovalis* were prepared with the same nutrient solution and under the same culture conditions as described above.

EXAMPLE 2

2.25 g. of the antibiotic SL 1846 are dissolved in 360 cc. of ethyl acetate and hydrogenation is effected at room temperature and normal pressure for 20 minutes in the presence of 2.25 g. of palladium/calcium carbonate (1:9). After filtering off the catalyst the filtrate is evaporated to dryness in a vacuum and the residue chromatographed on 50 g. of silica gel. Elution is effected with chloroform/methanol (99.5:5), volume of the fractions 50 cc. Fractions 4 to 9 contain the pure dihydro derivative of the antibiotic SL 1846. $[\alpha]_D^{20} = -103°$ (c.=0.44 in chloroform). IR spectrum see FIG. 1.

What is claimed is:
1. The compound of formula:

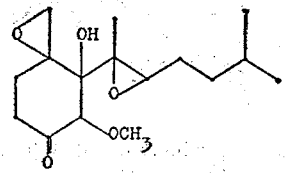

No references cited.

NORMA S. MILESTONE, Primary Examiner

U.S. Cl. X.R.

424—278